United States Patent Office 3,712,901
Patented Jan. 23, 1973

3,712,901
5-ANTHRAQUINONYL (1) AMINO-THIADIAZOLES
Hermann Weissauer, Ludwigshafen, Germany, assignor to Badische Anilin- & Soda-Fabrik Aktiengesellschaft, Ludwigshafen (Rhine), Germany
No Drawing. Filed Feb. 6, 1970, Ser. No. 9,445
Int. Cl. C07d 91/60
U.S. Cl. 260—303                                2 Claims

ABSTRACT OF THE DISCLOSURE

Anthraquinone dyes having a 1,2,4-thiodiazole group in the alpha-position. The dyes are valuable vat dyes.

---

The invention relates to new dyes containing 1,2,4-thiodiazole groups and their use as vat dyes.

The new and valuable dyes have the general formula:

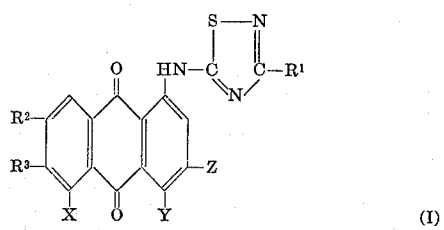

where X denotes a hydrogen atom or a benzoylamino group, Y denotes a hydrogen atom, an amino group, a benzoylamino group or a methoxy group, Z denotes a hydrogen atom, a methoxy group or one of the radical anthraquinone-[2,3-d]-oxazole-(2) of the formula

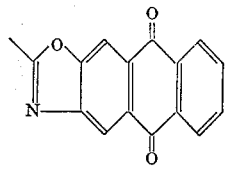

anthraquinone-[2,3-d]-thiazole-(2) of the formula

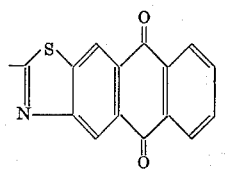

benzothiazole-(2) of the formula

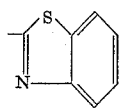

or 5-(4-chlorophenyl)-1,3,4-oxazole-(2) of the formula

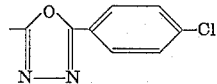

$R^1$ denotes a naphthyl radical or a phenyl radical which may bear halogen atoms, methyl groups or methoxy groups as substituents and the radicals $R^2$ and $R^3$ each denotes a hydrogen atom or a chlorine atom.

The new dyes according to this invention may be prepared for example by reacting an aminoanthraquinone compound having the general formula A—NH$_2$ (II) where A denotes the radical of the abovementioned 1-aminoanthraquinone compound with a compound having the formula:

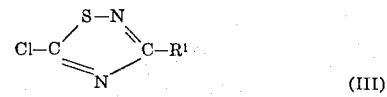

where $R^1$ has the meanings given above, advantageously in a molar ratio. This reaction is advantageously carried out in a high boiling solvent or diluent which is inert to the said starting materials such as o-dichlorobenzene, trichlorobenzene, nitrobenzene, naphthalene, phenol or in a mixture of the same, at temperatures of from 140° to 220° C.

It may be advantageous to carry out the reaction in the presence of an agent which promotes elimination of halogen hydride such as pyridine, dimethylformamide, p-toluenesulfonic acid or hydrochloric acid.

Examples of compounds having the Formula II are:

1-aminoanthraquinone,
1-amino-5-benzoylaminoanthraquinone,
1,4-diamino-2-anthraquinonyl-2',3'-anthraquinone-oxazole,
1,4-diamino-2-anthraquinonyl-2',3'-anthraquinone-thiazole,
2-(1',4'-diaminoanthraquinonyl-(2'))-5-(4"-chlorophenyl)-oxdiazole-(1,3,4),
1-amino-4-benzoylaminoanthraquinone,
1-amino-5-benzoylaminoanthraquinone,
1-amino-4-methoxyanthraquinone and
1,4-diamino-2-methoxyanthraquinone.

Examples of compounds having the Formula III are 3-phenyl-5-chloro-1,2,4-thiodiazole,
3-(m-tolyl)-5-chloro-1,2,4-thiodiazole,
3-(p-tolyl)-5-chloro-1,2,4-thiodiazole,
3-(o-chlorophenyl)-5-chloro-1,2,4-thiodiazole,
3-(p-methoxyphenyl)-5-chloro-1,2,4-thiodiazole,
3-(3,5-dichlorophenyl)-5-chloro-1,2,4-thiodiazole and
3-(α-naphthyl)-5-chloro-1,2,4-thiodiazole.

The new dyes are valuable vat dyes which are characterized by good fastness properties and a high brilliance. They may also be used as pigment dyes, for example for coloring plastic compositions, synthetic fibers and surface coating agents.

The invention is illustrated by the following examples in which the parts specified are parts by weight.

EXAMPLE 1

A mixture of 20.5 parts of 1-amino-5-benzoylaminoanthraquinone, 17.7 parts of 3-phenyl-5-chloro-1,2,4-thiodiazole, 0.1 part of p-toluenesulfonic acid and 60 parts of phenol is heated for four hours at 170° C. Filtration by suction is carried out at 80° C. through a heated suction filter and the filter cake is washed with 100 parts of hot methanol until the discharge is pale, then washed with 400 parts of hot water and dried.

A dye having the formula

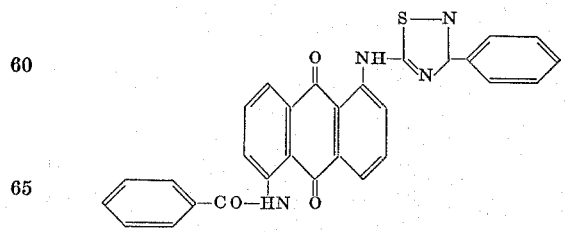

is obtained which dyes cotton bright scarlet shades having excellent wet fastness properties from the vat.

When equivalent amounts of 3-(p-tolyl)-5-chloro-1,2,4-thiodiazole or 3-(o-chlorophenyl)-5-chloro-1,2,4-thiodiazole are used instead of 3-phenyl-5-chloro-1,2,4-thiodiazole, dyes having similar shades are obtained. A much more reddish vat dye is obtained with 3-(p-methoxyphenyl)-5-chloro-1,2,4-thiodiazole and an orange vat dye with 3-(3,5-dichlorophenyl)-5-chloro-1,2,4-thiodiazole.

EXAMPLE 2

A mixture of 29.2 parts of 1-amino-6,7-dichloroanthraquinone, 29.2 parts of 3-phenyl-5-chloro-1,2,4-thiodiazole or 31.6 parts of 3-(p-tolyl)-5-chloro-1,2,4-thiodiazole is boiled for about five hours until starting material can no longer be detected in a thin layer chromatogram. The dye having the formula:

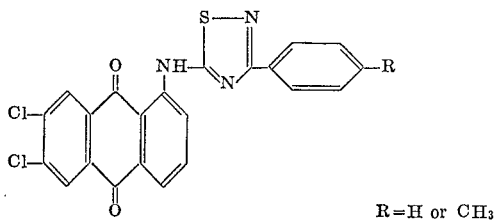

R = H or CH₃ is obtained by conventional working up. It dyes cotton bright green to orange shades from the vat.

EXAMPLE 3

A mixture of 24.2 parts of 1,4-diamino-2-anthraquinonyl-2',3'-anthraquinoneoxazole, 17 parts of 3-(p-methoxyphenyl)-5-chloro-1,2,4-thiodiazole, 100 parts of phenol and 0.1 part of p-toluene-sulfonic acid is boiled for two hours. It is allowed to cool to about 60° C. and 125 parts by volume of methanol is added to the melt which is then suction filtered while hot, washed with about 100 parts by volume of methanol, then with 1000 parts of hot water and dried. The dye having the formula:

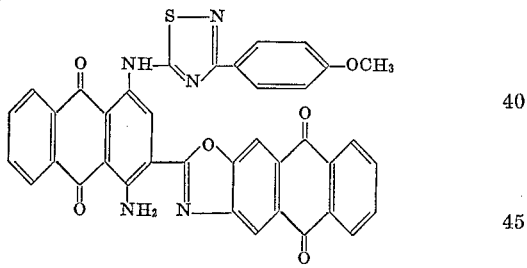

is obtained which dyes cotton full bluish green shades which are fast to light and wet from the vat.

Bluish green dyes are similarly formed by using equimolar amounts of 3-phenyl-5-chloro-1,2,4-thiodiazole, 3-(p-tolyl)-5-chloro-1,2,4-thiodiazole or 3-(α-naphthyl)-5-chloro-1,2,4-thiodiazole instead of 3-(p-methoxyphenyl)-5-chloro-1,2,4-thiodiazole. By using equimolar amounts of 1,4-diamino-2-anthraquinonyl-2',3'- anthraquinonethiazole or 2'-(1,4-diamino-2-anthraquinonyl)-benzothiazole instead of 1,4-diamino-2-anthraquinonyl-2',3'-anthraquinoneoxazole, the corresponding dyes are obtained by analogous reaction of the amino group in the 4-position.

EXAMPLE 4

20.8 parts of 2-(1',4'-diaminoanthraquinonyl-(2'))-5-(4''-chlorophenyl)-oxdiazole-(1,3,4) and 15 parts of 3-phenyl-5-chloro-1,2,4-thiodiazole is boiled for three hours in 120 parts of phenol. By conventional working up, a dye is obtained which dyes cotton navy blue shades. A navy blue dye is also formed when using 2-(1',4'-diaminoanthraquinonyl - (2')) - 5 - (anthraquinonyl(2''))-oxdiazole-(1,3,4). The two dyes have the formula:

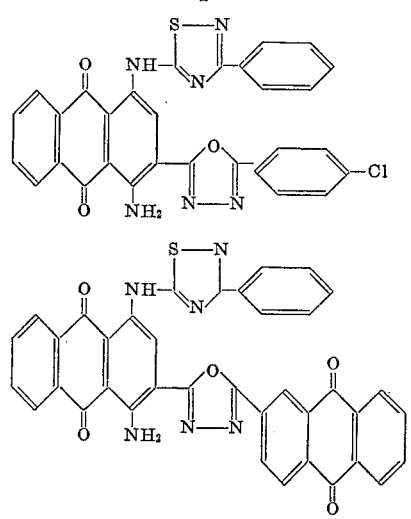

I claim:
1. A compound of the formula

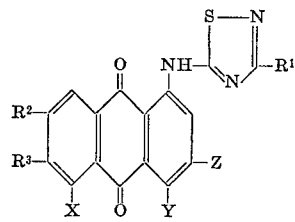

wherein
X is hydrogen or benzoylamino;
Y is hydrogen, amino or benzoylamino;
Z is hydrogen or one of the radicals

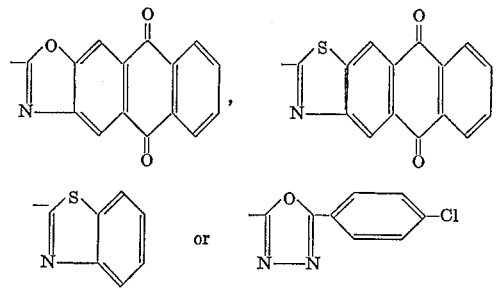

$R^1$ is α-naphthyl, phenyl, or phenyl substituted by methyl, methoxy or chlorine; and
$R^2$ and $R^3$ each denotes hydrogen or chlorine.

2. The dye having the formula:

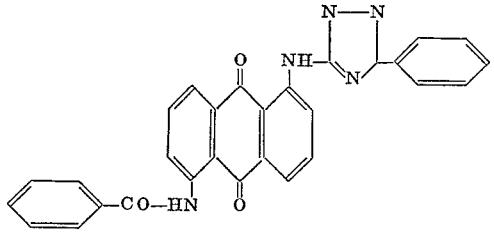

No references cited.

ALEX MAZEL, Primary Examiner
J. TOVAR, Assistant Examiner

U.S. Cl. X.R.
8—34